No. 806,554. PATENTED DEC. 5, 1905.
P. Y. MILLER.
ADJUSTABLE SADDLE FOR HARNESS.
APPLICATION FILED MAR. 2, 1905.

WITNESSES:
J. A. Brophy
Wm. P. Patton

INVENTOR
Pickens Y. Miller
BY
ATTORNEYS

UNITED STATES PATENT OFFICE.

PICKENS YOUNG MILLER, OF HERMANVILLE, MISSISSIPPI.

ADJUSTABLE SADDLE FOR HARNESS.

No. 806,554.　　　　Specification of Letters Patent.　　　　Patented Dec. 5, 1905.

Application filed March 2, 1905. Serial No. 248,041.

*To all whom it may concern:*

Be it known that I, PICKENS YOUNG MILLER, a citizen of the United States, and a resident of Hermanville, in the county of Claiborne and State of Mississippi, have invented a new and Improved Adjustable Saddle for Harness, of which the following is a full, clear, and exact description.

The harness used for draft-animals is usually provided with an arched saddle whereon a transversely-arranged back-strap is imposed and at its ends is connected with the shafts of a cart or the like, whereby a portion of the load is carried by the animal. As the contours of the backs of working animals vary, it is essential for a proper engagement of the harness-saddle with the backs of different animals that the saddle be made adjustable, so that the pads of the saddle may be given a proper set or degree of divergence for their comfortable engagement with the back of an animal whereon the harness is placed and avoid contact with the spine.

The object of this invention is to provide novel details of construction which afford an adjustable saddle that is extremely simple, practical, quickly adjusted automatically, is strong, neat in design, quite light, durable, and inexpensive.

The invention consists in the novel construction and combination of parts, as is hereinafter described, and defined in the subjoined claims.

Reference is to be had to the accompanying drawings, forming a part of this specification, in which similar characters of reference indicate corresponding parts in all the figures.

Figure 1:
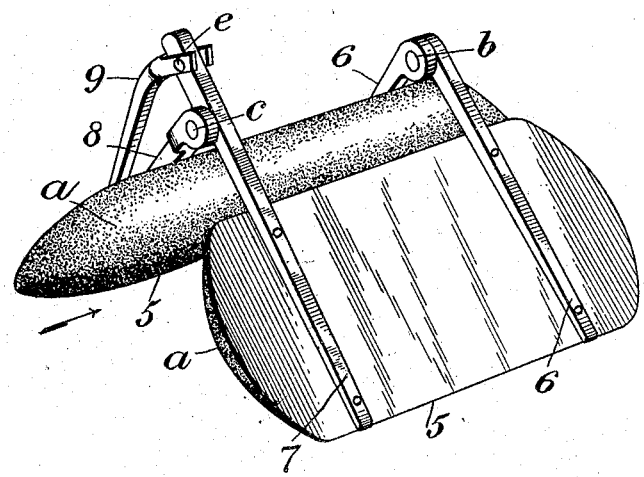
Figure 2:
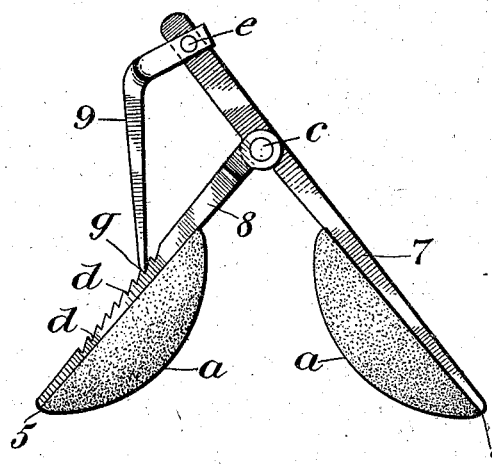
Figure 3:
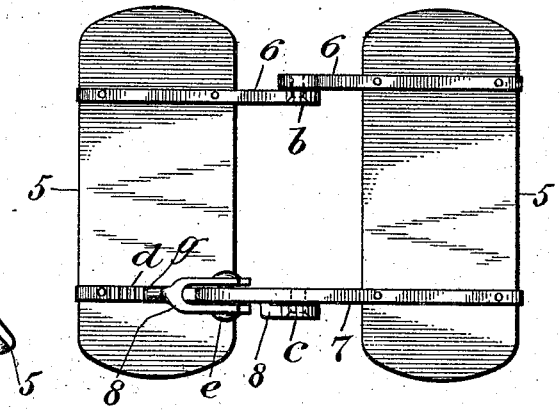

Figure 1 is a perspective view of the improved harness-saddle. Fig. 2 is an end view of the same seen in direction of the arrow in Fig. 1, and Fig. 3 is a plan view of the improvement.

The twin pads 5 5, which are the main portions of the saddle, are preferably formed of a hard wooden block having suitable dimensions for effective service. In contour the pads 5 each have parallel side edges and rounded ends, their outer surfaces being flat and their opposite faces, which have contact with the animal, are rendered convex, as shown at $a$, thus adapting them for comfortable pressure upon the animal at opposite sides of the body near the spine. The pads 5 may be cushioned on their convex faces $a$ or be without any covering thereon.

Near corresponding ends of the pads 5 leaves 6 6 of a strap-hinge are mounted upon the flat exterior surfaces thereof and secured by screws or rivets, as may be preferred, and the length of said hinge-leaves is so proportioned that their hinge-joint connection $b$ is positioned somewhat above the normally upper side edges of the pads, as is clearly shown in Fig. 1. Near the opposite end of one of the pads 5 a hinge-bar 7 is mounted and secured parallel with the hinge-leaf 6 thereon, and, as shown, the hinge-bar projects a distance above the upper side edge of the pad somewhat greater than that of the upper end of the hinge-leaf 6. Upon the hinge-bar 7, opposite the hinge-joint $b$, a hinge-leaf 8 is pivoted by one end, this leaf having equal length to that of the hinge-leaves 6 6, and as the pivot $c$, that connects the bar 7 with the hinge-leaf 8, is alined with the pivot in the joint $b$ it will be seen that the pads 5 5 may be rocked freely upon the joints $b$ and $c$, so as to adjust them toward or from each other. A series of ratchet-teeth $d$ is formed in the outer side of the hinge-leaf 8, which teeth hook toward the joint $c$. Upon the upper end of the hinge-bar 7 the preferably forked end of a bent arm 9 is pivoted, as indicated in the drawings at $e$, the lower portion of said arm being sharpened for engagement as a pawl $g$ with either of the ratchet-teeth $d$, and it will be evident that the engagement of the pawl or toe $g$ with a tooth $d$ will hold the pads 5 from rocking away from each other.

In using the improved harness-saddle it is placed upon a draft-animal over the spine at a proper point and the bent arm 9 is adjusted so as to permit a proper divergence of the pads 5 to insure a comfortable contact of their convex surfaces $a$ with the back of the beast, whereupon the back-band (not shown) may be placed upon the pads for imposing load strain thereon. If it is found necessary, the pads 5 may be quickly changed in adjustment toward or from each other by relaxing the back-band, so as to permit a free movement of the pads on their hinge-joints, and if they are to be closed more or less this can be effected by raising the pads a proper degree, which will slide the pawl or toe $g$ over the ratchet-teeth $d$ toward the hinge-joint $c$ and adapt it to engage a tooth $d$ nearer said joint, thus contracting the space between the pads, so that they will bear upon the back of the animal nearer the spine. If the pads 5 are too close to each other for their comfortable engagement with the back of a draft-animal, they may be further diverged from each other a proper distance by lifting the arm 9, so as to remove the toe g from engagement with a tooth d and then spreading the pads apart as may be desired and dropping the arm for an engagement of the pawl-toe g with a tooth d of the series that is brought opposite said toe by the adjustment of the pads, as explained, which will hold the latter stationary.

As the load strain imposed upon the pads 5 by a back-band may be evenly distributed over the convex surfaces of the pads 5 by their adjustment, it will be seen that chafing and improper distribution of load strain will be prevented by an employment of the improved harness-saddle.

Having described my invention, I claim as new and desire to secure by Letters Patent—

1. In a harness-saddle, the combination with two similar pads having convexed corresponding sides, and a hinge secured by its leaves on the pads near one end thereof, of a hinge-bar on one of said pads near its other end, said bar extending a distance above said pad, a hinge-leaf secured opposite the hinge-bar on the other pad and pivoted on the hinge-bar between its end and the edge of the pad said bar is secured upon, a plurality of projections on this hinge-leaf, and an arm pivoted on the extended end of the hinge-bar, the free end of said arm engaging an appropriate projection on the hinge-leaf for holding the pads from improper divergence.

2. In a harness-saddle, the combination with two similar pads, flat outside and convexed on their inner sides, and a strap-hinge secured by its leaves on the exteriors of the pads near corresponding ends thereof, of a hinge-leaf secured on the exterior of one pad near its opposite end, a hinge-bar on the other pad opposite said hinge-leaf and whereon said leaf is lapped at its free end and pivoted thereto, and a bent arm pivoted upon an extended end of the hinge-bar above the hinge-leaf, said leaf having projections either of which may be engaged by the lower end of the arm for holding the pads from spreading.

3. In a harness-saddle, the combination with two similar pads having flat outer sides and convexed adjacent sides, a strap-hinge having its leaves secured upon the flat sides of the pads near corresponding ends thereof, a hinge-bar secured on one of said pads parallel with the opposed leaf of the other hinge, and a hinge-leaf fixed upon the outer side of the other pad and pivoted on the hinge-bar in alinement with the pivot of the other hinge, of a series of teeth on said pivoted hinge-leaf, and a bent arm pivoted upon the hinge-bar above the hinge-joint thereon, said bar having a toe on its free end that may engage any one of the series of teeth for holding the pads from further divergence.

In testimony whereof I have signed my name to this specification in the presence of two subscribing witnesses.

PICKENS YOUNG MILLER.

Witnesses:
A. R. CHUNN,
GEO. W. ROBERTSON.